(12) United States Patent
Voltz et al.

(10) Patent No.: US 7,501,597 B2
(45) Date of Patent: Mar. 10, 2009

(54) CONTROL DEVICE FOR A PASSENGER SEAT

(75) Inventors: Steffen Voltz, Rossdorf (DE); Joachim Voigt, Nidderau (DE)

(73) Assignee: Duetsche Luftansa AG (DE)

( * ) Notice: Subject to any disclaimer, the term of this patent is extended or adjusted under 35 U.S.C. 154(b) by 1066 days.

(21) Appl. No.: 10/483,041

(22) PCT Filed: Jun. 18, 2002

(86) PCT No.: PCT/EP02/06718

§ 371 (c)(1),
(2), (4) Date: Feb. 12, 2004

(87) PCT Pub. No.: WO03/004305

PCT Pub. Date: Jan. 16, 2003

(65) Prior Publication Data

US 2004/0129543 A1    Jul. 8, 2004

(30) Foreign Application Priority Data

Jul. 6, 2001    (DE) ................ 101 32 323

(51) Int. Cl.
*H01H 9/00* (2006.01)
(52) U.S. Cl. .................... 200/298; 200/5 R
(58) Field of Classification Search .......... 200/5 R; 307/9.1, 10.1, 10.7, 10.3, 10.5; 340/5.1, 340/5.2–5.23, 5.6–5.66, 5.8; 701/36, 49
See application file for complete search history.

(56) References Cited

U.S. PATENT DOCUMENTS

| 4,204,255 | A | | 5/1980 | Cremer |
|---|---|---|---|---|
| 4,477,874 | A | * | 10/1984 | Ikuta et al. ............... 701/49 |
| 5,460,347 | A | * | 10/1995 | Schacher .............. 248/316.5 |
| D412,706 | S | * | 8/1999 | Virost .................. D14/217 |
| 6,104,101 | A | * | 8/2000 | Miller et al. ............. 307/10.1 |
| 6,369,529 | B1 | * | 4/2002 | McClintock et al. ......... 318/16 |
| 6,615,123 | B2 | * | 9/2003 | Morehouse ............... 701/49 |
| 6,636,197 | B1 | * | 10/2003 | Goldenberg et al. ....... 345/156 |
| 6,682,494 | B1 | * | 1/2004 | Sleichter et al. ........... 601/57 |
| 6,741,920 | B1 | * | 5/2004 | Otto ..................... 701/49 |
| 6,910,628 | B1 | * | 6/2005 | Sehr ................... 235/384 |

FOREIGN PATENT DOCUMENTS

| FR | 2 696 384 | 4/1994 |
|---|---|---|
| FR | 2 737 686 | 2/1997 |
| GB | 2 334 673 | 1/1999 |

* cited by examiner

*Primary Examiner*—Michael A Friedhofer
(74) *Attorney, Agent, or Firm*—Robert W. Becker; Robert W. Becker & Assoc.

(57) ABSTRACT

A wireless passenger seat control device, particularly for an aircraft, has at least two ranges of functions. One of the ranges of functions includes seat adjustment. The operation of the device is simplified if the control units for the at least two ranges of function, particularly for the seat adjustment and the audio/video functions, are combined in one common housing and only mechanically attached to the seat.

9 Claims, 1 Drawing Sheet

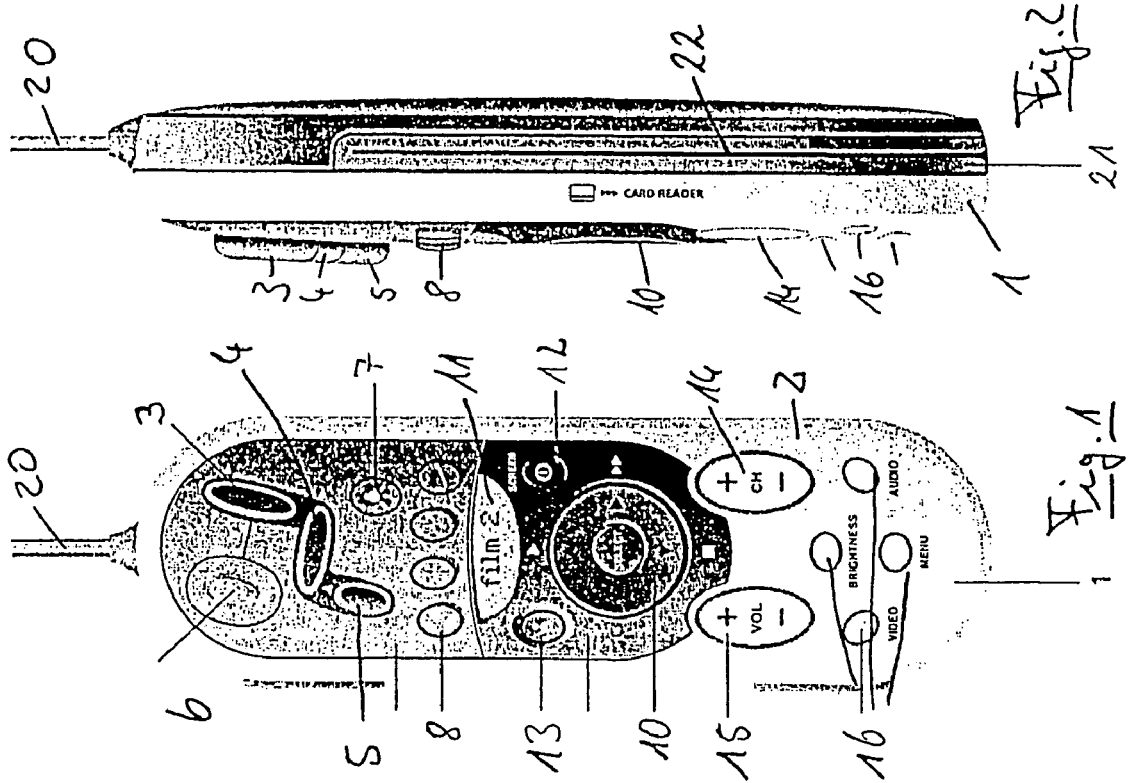

CONTROL DEVICE FOR A PASSENGER SEAT

BACKGROUND OF THE INVENTION

It is therefore an object of the present invention to unify the control of the infotainment functions and the seat functions.

In known seats for aircraft, trains and the like, control units are provided for so-called infotainment functions, which in the simplest case include volume and programs selection for audio transmissions. In more convenient units, particularly in aircraft, the control unit also includes control means for TV, video, e-mail, internet functions and, where appropriate, the telephone. Control units of this kind are physically and functionally separate from the control units for seat functions, which comprise seat adjustment and, where required, other seat functions.

When the controls for infotainment and for seat control are separately arranged in the way described, it is on the one hand necessary for this to be fitted and wired in the seat separately, which means that fitting is more expensive. On the other hand, the passengers are faced with two different control units, which may possibly be positioned in different places and may need to be operated in different ways. In practice, this is undesirable.

It is therefore an object of the present invention to unify the control of the infotainment functions and the seat functions. This is achieved by a control device having the features given in claim 1.

SUMMARY OF THE INVENTION

This object is realized by a control device, for a passenger seat in a means of transport, having at least two ranges of functions, one of which includes seat adjustment. wherein control units for the at least two ranges of functions are combined in a common housing.

Because the control units are combined in one common housing they are at the same place, which means that they can fitted into a housing simultaneously in one assembly operation and can be found, all together, by the passenger. The way in which they operate can also be matched visually and electromechanically when this is the case.

The two control units are preferably situated in one housing of a hard-wired or wireless remote control for the seat. Where the remote control is wireless it may be connected to the seat, in such a way that it cannot be lost, via a fastening means which performs purely mechanical functions.

The control device may also be connected to an identifying unit which identifies the passenger and, if required, calls up and accepts stored values for the preferred seat setting or the preferred infotainment setting. In the simplest instance, the identifying unit is in this case a card reader, for chip or magnetic cards for example. The data for the preferred settings may be stored on the card and, on a different journey, may be called up again by a seat which operates in the same way on a different means of transport.

The identifying device may also be arranged to be a credit-card reader or a reader of cards held by members of frequent flyer programs. Chargeable services such as pay-TV, the internet or telephone may then be charged for at the same time via these cards.

BRIEF DESCRIPTION OF THE DRAWINGS

In what follows, an embodiment of the present invention is described by reference to the drawings.

In the drawings:

FIG. 1 is a plan view of a control device for an aircraft seat in the form of a hard-wired remote control;

FIG. 2 is a side view of the control device shown in FIG. 1; and

FIG. 3 is a rear view of the control device shown in FIG. 1.

DESCRIPTION OF PREFERRED EMBODIMENTS

FIG. 1 is a plan view of a hard-wired remote control for an aircraft seat. A remote-control housing 1 comprises, in that part of a manipulable housing 2 which is at the top in FIG. 1, a switching member 3 for functions of the backrest of the seat, a switching member 4 for functions of the horizontal surface of the seat, and a switching member 5 for functions of the leg-rest or foot-rest. A further control 6 is provided for a lumbar support in the back-rest.

Also provided for the functions of the seat are a light-switch 7 and, at 8, a total of four switches for pre-selected positions (eating, reading, resting, lying).

Below the controls for the seat functions is provided, at 10, a section having controlling units for video functions (fast forward, rewind, start and stop). A display 11 shows the audio or video source selected or other functions. The screen situated in the passenger's field of vision can be switched on and off with an on-and-off switch at 12. Service can be requested with a switch 13.

Below the controls which have been described, there is in turn a switch 14 for channel selection, a volume control 15 and various changeover switches 16 for video, audio, screen brightness and a menu. All the functions which have been described up to this point are incorporated in the control unit 1. When the passenger seat is being assembled, they can therefore be purchased as a single, fully prefabricated bought-in or manufactured part and can be connected to the seat by a connecting cable 20. Consequently, this control unit is particular easy to fit and the fitting is particularly economical of time, and thus of cost as well.

For the user, this control device has the advantage that all the functions required for comfort and convenience during a journey can be found at the same point. There is no need for him to make a search for the different control units for the different comfort-enhancing functions and, particularly with the embodiment of a hard-wired remote control that is shown, he does not have to direct his attention to different control units.

FIG. 2 is a side-view, from the right, of the control device shown in FIG. 1. Built into the side of the housing of the control device 1 is a card reader 21 which has a slot 22, open at the side, for the insertion of a magnetic card.

The personal details of the passenger can be queried with this magnetic card. On the card he can store seat settings that have been made personally, which may for example be assigned to the keys 8. These preferred seat settings can then be called up again at a later date in a seat of similar or identical construction. Preferred settings for the audio and video functions may also be stored and called up and finally, charging data may be transmitted which enables the passenger to use chargeable infotainment services such as for example pay-TV, computer games or games of chance and internet functions and, where applicable, telephone, without these having to be charged for in a separate process which may possibly be seen as a nuisance.

It is also possible for functional devices for controlling internet, e-mail or other functions which require a user input to be provided on the back of the control device. Controls of this kind arranged on the back are identified in FIG. 3 by reference numerals 23, 24 and 25.

Although the present invention has been elucidated in the present case by reference to a control device which is constructed in the form of a hard-wired remote control, control devices of this kind may also be constructed in wireless form. In particular, it is also possible for a control device which transmits by wireless means to be connected to the given seat, in such a way that it cannot be lost, by a traction means such as a cable of rope-like form for example, thus doing away with the electrical cable connection, which may possibly be vulnerable mechanically.

The specification incorporates by reference the disclosure of German priority document 101 32 323.9 filed Jul. 6, 2001 and PCT/EP02/06718 filed Jun. 18, 2002

The present invention is, of course, in no way restricted to the specific disclosure of the specification and drawings, but also encompasses any modifications within the scope of the appended claims.

The invention claimed is:

1. A wireless control device, for a passenger seat in a means of transport, having at least two ranges of functions, one of which includes seat adjustment, comprising:

control units for said at least two ranges of functions, wherein said control units are combined in a common housing of a wireless remote control of a seat, and wherein said housing of said wireless remote control is connected to said seat, in such a way that said wireless remote control cannot be lost, via a fastening means that performs purely mechanical functions.

2. A control device according to claim 1, wherein said at least two ranges of functions include seat adjustment and audio/video functions.

3. A control device according to claim 1, wherein two control units are provided.

4. A control device according to claim 1, which is further provided with an identifying device suitable for identifying a passenger, directly or indirectly, and, if required, for calling up and accepting stored values for at least one preferred seat setting or for preferred infotainment settings.

5. A control device according to claim 4, wherein said identifying device is a card reader.

6. A control device according to claim 5, wherein said card reader is provided for chip or magnetic cards.

7. A control device according to claim 5, wherein data for preferred setting can be stored on a card and, on a different journey, are adapted to be called up again by a seat that operates In the same way on a different means of transport.

8. A control device according to claim 4, wherein said identifying device is set up as a credit-card reader or as a reader of cards held by members of frequent flyer programs.

9. A control device according to claim 5, wherein cards may be used to charge services such as pay TV, the internet or telephones.

* * * * *